UNITED STATES PATENT OFFICE.

RALPH R. PARISH, OF WATERBURY, CONNECTICUT, ASSIGNOR TO CHASE ROLLING MILL CO., OF WATERBURY, CONNECTICUT, A CORPORATION.

PROCESS FOR THE EXTRACTION OF ZINC FROM ZINC-BEARING REFUSE.

1,104,922.  Specification of Letters Patent.  Patented July 28, 1914.

No Drawing.  Application filed May 7, 1914. Serial No. 836,942.

*To all whom it may concern:*

Be it known that I, RALPH R. PARISH, a citizen of the United States, residing at Waterbury, in the county of New Haven and State of Connecticut, have invented a new and useful Improvement in Processes for the Extraction of Zinc from Zinc-Bearing Refuse; and I do hereby declare the following to be a full, clear, and exact description of the same.

My invention relates to an improved process for the extraction of zinc from the zinc-bearing refuse of brass foundries and brass rolling mills, such as flue-dust, precipitated stack-dust, crucible-skimmings, floor-sweepings and precipitated furnace-fumes. The zinc present in these several waste products has heretofore been lost and this loss has had to be charged to the cost of the ultimate product.

The object of my invention is to recover the zinc present in all such zinc-bearing refuse or waste of whatever form and however produced and thus reduce the expense of producing all forms of commercial brass.

With these ends in view, my invention, broadly speaking, resides in a process of recovering zinc from zinc-bearing refuse and consisting in gradually introducing such refuse into dilute sulfuric acid agitated with compressed air, the refuse being gradually added and the acid strength of the solution being maintained relatively constant by the addition of acid until the solution contains a high concentration of zinc salts after which the remaining free acid in the solution is neutralized by the addition of an excess of zinc-oxid bearing refuse, then agitating the solution with compressed air until all of the iron is precipitated, then removing the insoluble residues from the solution, and then purifying the solution by cementation.

In carrying out my invention, I take a given quantity of the zinc-bearing refuse and add it gradually to a tank containing a solution of from 1% to 5% of sulfuric acid. I may here state that my object in treating the refuse with dilute sulfuric acid is for the reason that dilute sulfuric acid has a preferential dissolving action upon the zinc-bearing material rather than upon the impurities associated therewith, whereas if I employ strong sulfuric acid substantially all of the impurities would be dissolved out of the refuse as well as the zinc. Beginning with the gradual introduction of the refuse into the sulfuric acid, the same is continuously agitated with compressed air. The process having been started as described, the refuse is gradually added to the solution which is maintained at a relatively constant acid concentration by the continuous addition of sufficient quantities of acid, the agitation with compressed air being continued. When the solution is found by tests to contain a high concentration of zinc salts, say, from 30° to 45° Baumé, the remaining free acid in the solution is neutralized by the addition of an excess of zinc-oxid bearing refuse, it being necessary at this stage of the process to add zinc refuse containing oxid to the concentrated solution for the replacement of iron in the solution. The agitation of the concentrated and now neutralized solution with air is continued until all of the iron has been precipitated. If the testing of the crude refuse reveals the presence of manganese, it will be necessary to agitate the solution with compressed ozonated air since compressed air will not be sufficient to effect the precipitation from the solution of the manganese which the ozonated air converts into an insoluble oxid. When the concentrated solution is shown by tests to be free from iron and manganese, it is freed from its insoluble residues, such as precipitated iron, manganese, silica, etc., either by decantation or filtration. The resulting concentrated impure solution thus secured, consists of neutral zinc sulfate containing as impurities copper and cadmium sulfates, and certain alkaline and alkaline earth sulfates in small quantities. The solution is then further purified by cementation for the removal of its copper and cadmium and other heavy metals below the cementing metal in the electro-motive series. The cementing metal used at this stage of the process will preferably be zinc in the form of dust and shavings. The resulting pure neutral solution of zinc sulfate may now be evaporated to form hydrated crystals of sulfate or may be treated electrolytically to produce pure zinc metal.

I claim:—

1. A process of recovering zinc from zinc-bearing refuse consisting in gradually introducing such refuse into dilute sulfuric acid agitated with compressed air, the refuse being gradually added and the acid strength of the solution being maintained relatively constant by the addition of acid until the solution contains a high concentration of zinc salts after which the remaining free acid in the solution is neutralized by the addition of an excess of zinc oxid bearing refuse, then agitating the solution with compressed air until all of the iron is precipitated, then removing the insoluble residues from the solution, and then purifying the solution by cementation.

2. A process of recovering zinc from zinc-bearing refuse consisting in gradually introducing such refuse into dilute sulfuric acid agitated with compressed air, the refuse being gradually added and the acid strength of the solution being maintained relatively constant by the addition of acid until the solution contains a high concentration of zinc salts after which the remaining free acid in the solution is neutralized by the addition of an excess of zinc oxid bearing refuse, then agitating the solution with ozonated compressed air until all of the manganese is precipitated, then removing the insoluble residues from the solution, and then purifying the solution by cementation.

In testimony whereof, I have signed this specification in the presence of two subscribing witnesses.

RALPH R. PARISH.

Witnesses:
GEO. D. SEYMOUR,
CLARA L. WEED.